United States Patent [19]

Paoli

[11] Patent Number: 5,194,242
[45] Date of Patent: Mar. 16, 1993

[54] PROCESS FOR THE PRODUCTION OF HYDROGEN PEROXIDE FROM HYDROGEN AND OXYGEN

[75] Inventor: Michael A. Paoli, Memphis, Tenn.

[73] Assignee: E. I. Du Pont de Nemours and Company, Wilmington, Del.

[21] Appl. No.: 580,523

[22] Filed: Sep. 11, 1990

[51] Int. Cl.$^5$ .............................................. C01B 15/01
[52] U.S. Cl. .................................................... 423/584
[58] Field of Search ........................................ 423/584

[56] References Cited

U.S. PATENT DOCUMENTS

| | | | |
|---|---|---|---|
| 3,423,176 | 1/1969 | Kabisch et al. | 423/588 |
| 4,428,923 | 1/1984 | Kunkel et al. | 423/588 |
| 4,996,039 | 2/1991 | Pralus et al. | 423/584 |

OTHER PUBLICATIONS

Ser. No. 420,514 filed Oct. 12, 1989 (corresponding to U.S. Pat. No. 4,996,039).

Primary Examiner—Wayne Langel
Attorney, Agent, or Firm—Charles E. Krukiel

[57] ABSTRACT

A process and apparatus for the production of hydrogen peroxide directly from hydrogen and oxygen utilizing a pipeline reactor for establishing a reaction zone for the reaction of these gases within an acidic aqueous solution, is disclosed. The reaction zone is completely filled with the solution and a reaction mixture is formed by dispersing hydrogen gas and oxygen gas in the solution in proportions above the lower flammability limit under control conditions resulting in the formation of hydrogen peroxide. This reaction mixture is maintained until the proportion of hydrogen has decreased to below the lower flammability limit for the gas mixture. The hydrogen peroxide is then removed from the reaction zone. The reaction of the hydrogen and oxygen in the solution is conducted under plug-flow conditions.

19 Claims, 1 Drawing Sheet

PROCESS FOR THE PRODUCTION OF HYDROGEN PEROXIDE FROM HYDROGEN AND OXYGEN

FIELD AND HISTORICAL BACKGROUND OF THE INVENTION

This invention relates to a catalytic process for producing aqueous hydrogen peroxide safely from gaseous hydrogen and oxygen at a concentration above the lower flammability limit, and more particularly, it relates to such process which provides for the continuous production of an aqueous stream containing useable concentrations of hydrogen peroxide and an effluent gas stream containing residual hydrogen and oxygen at concentrations outside the flammable and explosive limits for hydrogen and oxygen mixtures.

The production of hydrogen peroxide by the direct reaction of hydrogen and oxygen in aqueous solution in the presence of a catalyst appears to have been first disclosed in 1914 in Hinkel et al, U.S. Pat. No. 1,108,752, and has been the subject of numerous patents to the present.

Over the years it has become well established that the reaction is best conducted at relative partial pressures of oxygen to hydrogen of at least 2/1, and that the selectivity of the reaction to produce hydrogen peroxide (rather than water) increases with increasing oxygen to hydrogen ratios. For example, U.S. Pat. No. 4,009,252 discloses reacting hydrogen with oxygen in an aqueous medium using selected concentrations a platinum-group catalyst and partial pressures of hydrogen and oxygen of at least 0.5 atmos. and 1.0 atmos., respectively, at oxygen/hydrogen ratios of 1.5 to 20/1, and preferably 2/1 to 10/1. U.S. Pat. No. 4,336,239, which relates to continuous a well as batchwise production of hydrogen peroxide from hydrogen and oxygen, discloses that it is preferred to carry out the process at oxygen/hydrogen ratios of above 5/1, with 12/1 and 15/1, as being generally more preferred ratios.

The reaction of hydrogen and oxygen to produce hydrogen peroxide is not without danger, however, since mixtures of hydrogen and oxygen are flammable, even explosive, at hydrogen concentrations above 5%, the lower flammability limit, which corresponds to oxygen/hydrogen mole ratios of 20/1 and below, and includes the generally preferred oxygen/hydrogen operating ratios. Accordingly, to minimize the risk of explosion or fire the art also teaches the use of a diluent gas, such as nitrogen helium, neon or argon, as disclosed in U.S. Pat. Nos. 4,009,252 and 4,661,337.

It has also been proposed to employ oxygen/hydrogen ratios that are well outside the flammable and explosive limits. U.S. Pat. No. 4,681,751, for example, discloses that it is preferred to employ oxygen/hydrogen ratios of 20/1 or higher to avoid the danger of explosion during continuous process runs. Similarly, U.S. Pat. No. 4,336,239, cited above, states the reaction can be carried out at oxygen/hydrogen ratios of 23/1–40/1 which are outside the limits of flammability and prevent an explosion hazard without requiring an inert diluent gas. Although providing a measure of safety, the use of inert gas diluents an high oxygen/hydrogen ratios are disadvantageous expedients. The result in unnecessarily high reaction pressures which necessitate the use of more costly high-pressure equipment. Further, oxygen/hydrogen mole ratios in excess of about 10/1 provide little or no improvement in the selectivity of the reaction to produce hydrogen peroxide.

Continuous operation of the direct combination process is highly desirable for the production of hydrogen peroxide. Continuous modes of operation described in the art, however, are not entirely satisfactory from a commercial standpoint. U.S. Pat. No. 4,279,883 describes a continuous process involving a stirred tank reaction system having a gaseous zone and a liquid zone, means for feeding reactant and diluent gases, means for feeding an aqueous liquid reaction medium containing dispersed metal catalyst, and means for the continuous removal of a spent gas composition and an aqueous liquid reaction product. Example 1 of the '883 patent shows the use of a gaseous feed mixture consisting of hydrogen, oxygen, and nitrogen at partial pressure of 5 atms., 49 atms., and 113 atms., respectively, corresponding to a nitrogen diluted oxygen/hydrogen ratio of 9.8/1.

The disclosed continuous process suffers in utilizing a relatively large ratio of nitrogen to the reactant gases which adds to the cost of the operation. It has also been found that in a stirred tank system, as above, dispersed metal catalyst tends to adhere to and creep up the walls of the reactor and the stirrer shaft into the gas zone where it can become exposed directly to the reactants in the gas phase. Should the catalyst dry out during the course of the reaction, there is the ever present danger that, in the absence of a diluent gas, the dry catalyst would catalyze of the hydrogen phase mixture. Thus, that prior art has employed diluent gas to guard against the possibility of fire or explosion during the exemplified continuous process.

The U.S. Pat. No. 4,336,239, cited above, discloses a continuous hydrogen peroxide process conducted in a tower reaction packed with catalyst and equipped with means for upward concurrent feed of hydrogen peroxide and reaction solvent. At the top of the reactor, there is a device for the removal of liquid samples, means for transferring the reactor effluent to a liquid gas separator, means for venting spent gaseous effluent and means for introducing a diluent stream of nitrogen. The patentees describe a series of runs in Examples 3, 4 and 5 utilizing hydrogen and oxygen over a wide range of oxygen/hydrogen ratios, i.e., from about 2.9/1 to about 30/1. Example 4 exemplifies oxygen/hydrogen ratios of 23/1 to 30/1, which are outside the limits of flammability or explosion.

It will be noted that the concentrations of hydrogen peroxide in the resulting liquid effluent are relatively low, ranging from 0.14 to 0.70 molar or about 0.5 to 2.4% by weight of the effluent. The composition of the spent gas vented from the gas-liquid separator is not described. The hydrogen peroxide production results, however, indicate that the residence time o hydrogen and oxygen in the tower reactor is insufficient to substantially lower their concentrations in the liquid reaction medium, so that where oxygen and hydrogen are fed to the reactor in ratios that are initially in the flammable-explosive range in those runs of Example 3 that do not employ a diluent as), these reactant components are still in the flammable-explosive range in the spent gas vented from the gas-liquid separator. This is further suggested by the presence of a diluent nitrogen feed means at the top of the lower reactor so that nitrogen can be fed to the gas-liquid separator as needed to maintain a "safe" gas composition in the gas zone of the separator and in the gas vented therefrom. This is still further suggested by (a) Example 3 run C which shows the use of oxygen-enriched air to provide a nonflammable hydrogen-containing feed composition, and (b) Example 4 which used oxygen/hydrogen feed ratios outside the limits of flammability or explosion.

The '239 process also suffers the disadvantage of involving liquid reaction media composed of or containing substantial proportions of organic solvents. These solvents not only add to the cost of the operation but result in hydrogen peroxide solutions having limited utility and marketability. Further, the organic components present the hazard of explosive peroxide buildup as disclosed in U.S. Pat. Nos. 4,009,252, 4,681,751, 4,772,458 and 4,389390. Although, as stated earlier, effluent gas containing unreacted hydrogen and oxygen can, if necessary, be rendered nonflammable and nonexplosive by use of diluent gas or excess oxygen, such uses only add both to the investment and operating cost of the process.

It is also known to conduct hydrogenation reactions, including for the production of hydrogen peroxide in the cyclic anthraquinone hydrogenation and oxidation process, in pipeline reactors, as disclosed in U.S. Pat. Nos. 3,423,176 and 4,428,923. The former reactor involves a plurality of upwardly directed elongated spaces (tubes) of smaller diameter alternate connected in series with a plurality of downwardly directed elongated spaces of larger diameter, the reactants being passed concurrently upwardly through the smaller diameter tubes and downwardly through the large diameter tubes. The above reaction system is not entirely satisfactory for the present purpose as it appears limited to relatively low flow velocities, i.e., up to 3 meters/second or about 9.9 feet/second.

More importantly, as pointed out in the '923 patent, phase separation of the gases/liquid reaction mixture can occur under certain conditions avoided in the hydrogen-oxygen reaction system, since oxygen would be present along with hydrogen in the separated gas phase, thus creating an explosion hazard within the reactor.

The '923 patent pipeline process is directed to the production of a hydrogenated anthraquinone intermediate to hydrogen peroxide. It utilizes a loop reactor made of tubes with the same nominal width, arranged vertically or horizontally and connected by curving tubes (elbows). The reactor length varies from 15 to 150 meters (about 50 to 500 feet), the inside diameter from about 350 to 700 mm (about 13.8 to 27.6 inches). Reaction flow velocities are greater than 3 and up to 10 meters/second (greater than about 9.8 and up to about 32.8 feet/second). preferably 4 to 7 meters/second (about 13 to 23 feet/sound). Such apparatus and process are designed, however, to eliminate pressure losses from the tube expansions and contractions in the '176 patent and to thereby increase reaction liquid flow velocity and consequently the production of the desired hydrogenated anthraquinone. Patentees provide no teaching relative to the direct combination of hydrogen and oxygen to form hydrogen peroxide or the problems of hydrogen-oxygen flammability associated with the direct combination process.

OBJECTS AND SUMMARY OF THE INVENTION

It is, therefore, the principal object of this invention to provide an improved catalytic process for the preparation of hydrogen peroxide from hydrogen and oxygen in aqueous solution which involves the use of hydrogen and oxygen in feed ratios that are in the flammable/explosive range and result in a spent gas stream that contains unreacted hydrogen and oxygen in concentrations outside the flammable and explosive limits.

Another object of this invention is to provide a safe process that produces aqueous hydrogen peroxide in high concentrations at high selectivity.

Still another object of this invention is to provide a high yield hydrogen peroxide process which includes recovering the spent gas stream containing unreacted hydrogen and oxygen and recycling it to the reaction zone along with make-up hydrogen and oxygen, as necessary, to provide oxygen to hydrogen ratios in the desired range.

Yet another object of this invention is to provide a cyclic process which includes recycling at least a portion of the aqueous hydrogen peroxide product solution to the reaction zone to obtain in the aqueous effluent containing a still higher concentration of hydrogen peroxide than the previous aqueous effluent.

The above objects of the invention are achieved by the nov process for the preparation of hydrogen peroxide from hydrogen and oxygen, which process comprises establishing a reaction zone for effective reaction between hydrogen and oxygen to form hydrogen peroxide, substantially completely filling the reaction zone with an acidic aqueous solution suitable for effecting said reaction of hydrogen and oxygen, providing in said reaction zone in contact with said aqueous solution a catalytically effective amount of a catalyst for the hydrogen-oxygen reaction, forming reaction mixture by dispersing hydrogen gas and oxygen gas in the acidic aqueous solution in proportions that are above the lower flammability limit for hydrogen and oxygen at a temperature and pressure sufficient to result in the formation of hydrogen peroxide, maintaining the reaction mixture at said temperature and pressure until the proportion of hydrogen in the reaction mixture has decreased to below the flower flammability limit for hydrogen and oxygen mixtures, removing aqueous hydrogen peroxide solution with its residual dispersed gas content from the reaction zone and allowing it to separate into a spent gas phase containing hydrogen and oxygen in proportions below the lower flammability limit and a liquid phase containing hydrogen peroxide and separating the liquid hydrogen peroxide phase form the spent gas.

Another preferred embodiment of this invention is a continuous process which comprises conducting the reaction of hydrogen and oxygen in the acidic aqueous solution in an elongated reaction zone, preferably a tubular one such as a pipeline reactor, under plug flow conditions.

Still another embodiment of this invention is a cyclic continuous process which comprises conducting the reaction of hydrogen and oxygen in an elongated tubular reaction zone, as above, recovering the spent gas and recycling it to the reactor along with make-up hydrogen, make-up oxygen in quantity sufficient in proportion relative to that of oxygen to below the flammability limit, and make-up acidic aqueous solution and catalyst as needed in the production of hydrogen peroxide.

Still another embodiment of this invention is staged addition of hydrogen along the length of the pipe to achieve greater total conversion of oxygen per pass through the pipe thereby reducing the volume of gas that must be recycled to achieve better economics.

BRIEF DESCRIPTION OF THE DRAWINGS

The above and other objects and advantages and novel features of the present invention will become apparent from the following detailed description of the invention illustrated in the accompanying drawings, in which.

DETAILED DESCRIPTION OF THE INVENTION

Figure 1:
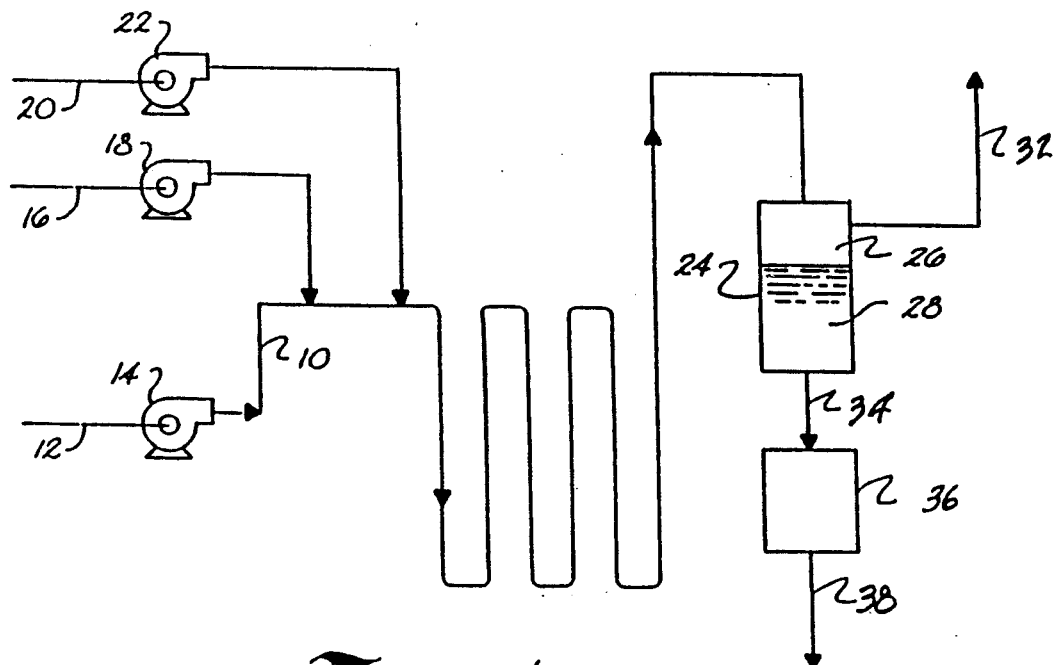
FIG. 1 is a schematic representation of one embodiment the invention which comprises conducting the reaction between hydrogen and oxygen dispersed in a suitable reaction medium in the presence of a catalyst in a pipeline reactor.

The invention takes advantage of the fact that the ignition of dispersed gaseous hydrogen and oxygen, even in explosive proportions, does not propagate through a liquid medium. Thus, in accordance with the invention, hydrogen and oxygen can be employed safely in flammable and explosive proportions by maintaining the hydrogen and oxygen gases dispersed and preferable separately dispersed in the liquid reaction medium in the substantial absence of a continuous free vapor space above A substantially absent vapor phase condition can be achieve in accordance with the invention by substantially completely filling the reaction zone with a liquid reaction medium so that essentially no free vapor space exists in the reaction zone. Thus, the catalyst for the hydrogen peroxide reaction is maintained wet with liquid at all times at least until the reaction has proceeded to the extent that the proportion of hydrogen in the reaction zone has decreased to below the lower flammability limit, i.e., below about 5.5 mole % of hydrogen based on the total residual hydrogen plus oxygen content, and preferably to below 4.5%, and more preferably to below about 3%, for added measure of safety.

The process is preferably conducted in a continuous manner in an elongated, preferably cylindrical reactor, such as a pipeline. The aqueous solution is fed under plug-flow condition so as to avoid or minimize backmixing within the reactor mixture The preferred pipeline reactor length can vary widely, but normally it will be in the range of from about 50 to 2000 feet, preferably from about 200 to 1500 feet, more preferably from about 400 to 1200 feet, and should be substantially greater than its inside diameter. The inside diameter is preferably constant along the reaction zone length and can range from about 1 to 36 inches, preferably from about 4 to 24 inches, and more preferably from about 6 to 18 inches. The ratio of the pipeline length to inside diameter, both taken in inches, will normally vary from about 25/1 to 1000/1, preferably 25/1 to 500/1, and more preferably 25/1 to 150/1 to facilitate maintenance of plug-flow conditions, to allow the hydrogen and oxygen to react to the desired extent yet not have excess, unutilized length which adds to process investment with no corresponding benefit.

The flow velocity of the aqueous solution and of the subsequently formed reaction mixture with its dispersed hydrogen and oxygen gases can vary widely and, for a nominal 2 inch I.D. pipe, it normally will range from about 4 to 18, preferably 9 to 14, ft./sec., depending on the composition of the aqueous solution, the particular catalyst and its concentration, the reaction temperature and the dimensions of the pipeline reactor and the specific design of the inlet gas spargers used. Whatever the process conditions, solution, catalyst, temperature, etc., the flow velocity should be coordinated with the dimensions of the pipeline so that the hydrogen and oxygen carried in the reaction mixture can react to the desired extent before it is discharged from the reactor. The process can also be conducted batchwise in a stirred tank reactor, provided the reaction mixture of gases dispersed in liquid reaction medium is held in the substantial absence of a free vapor space above the reaction mixture until the hydrogen concentration of the dispersed gases has fallen to below the lower flammability limit.

The partial pressure of hydrogen and the partial pressure of oxygen may vary widely but preferably are such as to provide super-atmospheric pressures in the range of about 200 to about 4000 psia, preferably about 400 to about 2500 psia, and more preferably about 800 to about 1400 psia, these pressures being the same as the partial pressure of the gases dispersed in the liquid medium. The proportion of hydrogen in the initial charge of hydrogen and oxygen taken together will be greater than the lower flammability limit and, normally, will amount to about 6 to 12 mole %. In other words, the ratio of the partial pressure of oxygen to the partial pressure of hydrogen will be about 16/1 to about 7/1, preferably about 13/1 to about 9/1. If desired, an inert gas may be employed in addition to the essential hydrogen and oxygen reactants, but is not needed for safety of operation provided that the conditions of the invention process are maintained throughout the reaction between hydrogen and oxygen the presence of the catalyst. The reaction temperature normally is in the 0° to 50° C. range, and more usually 10° to 30° C. for reasons of economy.

The reaction medium is aqueous, preferably acidic with typical hydrogen in concentrations in the range of about $1 \times 10^{-3}$ to 2M, and preferably substantially free of organic components. Typical acids imparting acidity are one or more of hydrochloric acid, hydrobromic acid, sulfuric acid, phosphoric acid, nitric acid and hydrochloride acid, with sulfuric acid and phosphoric acid preferred. Preferably, the aqueous solution contains bromide ion as a promoter, e.g., as hydrogen bromide, sodium bromide or other soluble bromide, or a compound hydrolyzable or reducible to bromide ion, as disclosed in U.S. Pat. Nos. 4,681,751, 4,772,458 and 4,889,705, which patents are incorporated herein be reference for their disclosures of suitable acidic aqueous solutions in the production of hydrogen peroxide from hydrogen and oxygen in the presence of a suitable catalyst.

The catalyst is normally palladium, platinum or palladium-platinum, although other Group VIII metals effective to catalyze the formation of hydrogen peroxide from hydrogen and oxygen may also be employed in catalytically effective amounts. Palladium and composite palladium-platinum catalysts are preferred. Where palladium-platinum is used, the weight ratio of platinum to palladium +platinum is preferably in the range of about 0.01 to about 0.5, more preferably about 0.02, as disclosed in U.S. Pat. No. 4,832,938. The metal or metals may be provided as one or more compatible salts, or as free (zero valent) metal, including colloidal, or other forms known in the art.

The catalytic metal or metals may be unsupported or carried on a support. Suitable supports include various forms of carbon, silica, alumina, silica-alumina, titania, ion exchange resins a others known in the art. The catalyst is normally a supported catalyst in particulate form slurred in the aqueous reaction liquid; alternatively, it may be disposed in the reaction zone a fixed bed or as an adherent coating on the walls of the reaction zone. The acidic aqueous solution may also maintain other components known in the art for promoting the production hydrogen peroxide or to prevent its decomposition during the course of the reaction. Exemplary are sequestiant type stabilizers for hydrogen peroxide, notably those based on phosphorus, as disclosed, for example, in U.S. Pat. No. 3,336,112 (Col. 1, lines 13-60) and U.S. Pat. No. 4,009,252 (Col. 4, lines 49-53). Preferred are the well-known phosphorate based stabilizers for hydrogen peroxide disclosed in U.S. Pat. No. 4,070,442 (Col. 2, lines 45-57).

APPARATUS AND OPERATION

Figure 2:
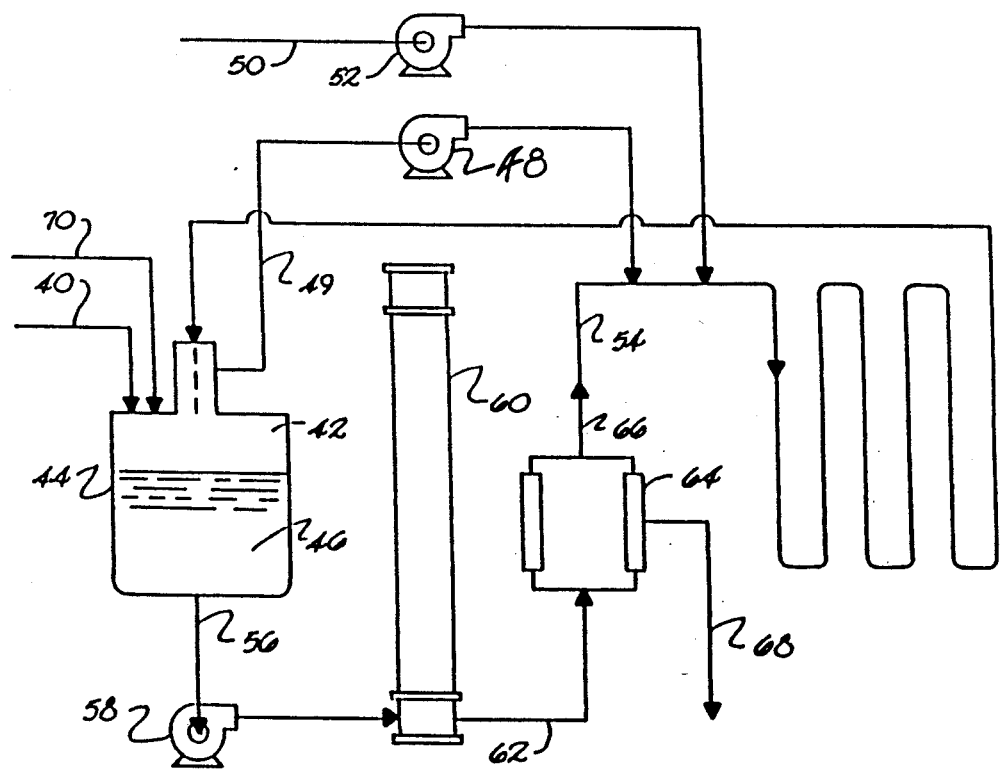
FIG. 2 schematically depicts a preferred embodiment of the invention which comprises conducting the process in a cyclic continuous manner in pipeline reactor system as in FIG. 1, but which includes means for recycling spent gas from the gas-liquid separator to the pipeline reaction zone along with make-up oxygen added to the spent ga in the gas-liquid separator.

The invention process will be better understood with reference to FIGS. 1 and 2. In a typical straight-through continuous operation in a representative FIG. 1 apparatus, an aqueous acidic solution containing a 0.05N to 0.5N mixture of sulfuric acid and phosphoric acid, 5-50 ppm of bromide ion, as sodium bromide, corresponding to about $6 \times 10^{-5}$ to $6 \times 10^{-4}$ molar Br—, and 0.2-2.0 weight % of a particulate 1-5% palladium on silica or alumina catalyst is fed into a 2 inch I.D. by 300 foot long pipeline reactor 10 through line 12 and pump 14 at a liquid velocity of between about 4 to 18 feet/second. Oxygen gas from line 16 is sparged into the aqueous solution as a fine dispersion of bubbles with the aid of compressor pump 18 at a point downstream from the aqueous solution feed point. Hydrogen gas is simultaneously sparged and dispersed into pipeline 1 via line 20 and compressor pump 22 at a feed point just downstream from the oxygen entry point. The resulting reaction mixture moves along the pipeline in plug flow. The partial pressure of oxygen is typically about 900-1100 psia and that of hydrogen is about 80-120 psia, so that the hydrogen concentration at the pipelin inlet is between 7 and 9% of the total, corresponding to oxygen/hydrogen mole ratio of between about 13.3/1 and 10.2/1. The temperature of the reaction mixture is maintained at 10°-30° C. with a heat exchanger, not shown.

As the reaction mixture flows plug-like through the pipeline reactor, molecules of hydrogen and oxygen, driven by their respective partial pressures within the dispersed bubbles of these gases, pass across the gas-liquid interface into the solution where they react in the presence of the catalyst to form hydrogen peroxide. Thus, hydrogen and oxygen are gradually consumed and hydrogen peroxide is gradually produced, resulting in concentration gradients of the reactant gases along the length of the pipeline, ranging from high at the hydrogen gas feed point to low at the reaction mixture disadvantage point at the gas-liquid separator 24. Similarly, there is also a hydrogen peroxide concentration gradient ranging from low to high as the reaction mixture plug-flows through the pipeline from the hydrogen feed point toward the discharge point at the separator 24. At that point, the aqueous reactor mixture, depleted in reactant gas and rich in reaction product, empties into the gas liquid separator where it separates into the gas zone 26, and the liquid zone 28. Spent gas, typically containing about 2-3% hydrogen and 98-97% oxygen, corresponding to oxygen/hydrogen mole ratio of about 24/1-34/1, outside the flammable and explosive limits, leaves the gas zone 26 through the line 32. The liquid portion of the reaction mixture containing hydrogen peroxide an suspended catalyst is drawn off through the line 34, filter 36 (to remove catalyst) and recovered through the line 38.. The recovered solution from a typical single pass operation normally contains less than 1% by weight hydrogen peroxide.

To produce higher hydrogen peroxide concentrations in the FIG. 1 apparatus, a portion of the liquid from the gas-liquid separator 24 can be recycled to the pump 14 inlet. Concentrations in excess of 1 wt % hydrogen peroxide typical of operation with no recycle can be made in the FIG. 1 apparatus.

The FIG. 2 apparatus exemplifies a preferred mode of operation which is cyclic and continuous, and involves recycle of spent gas and at least a portion of the hydrogen peroxide-containing liquid phase of the reaction mixture to the pipeline reactor to minimize consumption of ingredients, thereby the process more economical. In this mode, oxygen gas is first fed from the line 40 to the gas zone 42 of the gas-liquid separator 44, having a liquid zone 46 where it mixes with the residual mixture of hydrogen and oxygen (consisting largely of oxygen) from a previous cycle, and the gas mixture is conveyed via compressor pump 48 and line 49 to the pipeline 54. Fresh hydrogen gas is fed through line 50 and compressor pump 52 into the pipeline 54, as was the case for pipeline 10 in FIG. 1. Acidic aqueous solution, whether fresh as described in FIG. 1 or reaction mixture containing hydrogen peroxide being recycled is fed via the line 56, pump 58, through a heat exchanger 60, which controls reaction mixture temperature, line 62, candle filter 64 and the exit line 66 into reactor 54 at a point upstream from the points of entry of the oxygen and hydrogen reactants. Reaction mixture free of dispersed gases and suspended catalyst can be removed from the loop, as desired, through line 68 leading from filter 64. Make-up aqueous solution, with our without added catalyst, can be added through line 70 as needed.

By such cyclic continuous process, using conditions more specifically described for the FIG. 1 operation, aqueous solution can be recovered containing higher and higher concentrations, typically 5 to 20% by weight hydrogen peroxide, depending on the number of recycles of reaction mixture liquid employed.

The invention process, whether operated as described in connection with FIG. 1 or FIG. 2, is amenable to automated control of its vital functions and steps, including feed of the hydrogen and oxygen gases and the monitoring of the concatenation of hydrogen relative to that of oxygen in the pipeline so that the reaction mixture with its dispersed gases is maintained in the pipeline in the absence of a free vapor space and is not discharged into the gas-liquid separator until the hydrogen concentration is below the lower flammable limit. To ensure operation safety, the automated system is equipped with an interlock system which prevents the hydrogen content of the gas volume in the gas liquid separator from exceeding 4.0% by volume.

EXAMPLE 1

The apparatus of FIG. 1 was run with liquid recycle to build hydrogen peroxide concentration but without spent gas recycle. Spent gas was vented. Fresh water feed was set so as to produce approximately 5 wt % hydrogen peroxide in the reactor effluent. About 0.95% palladium +0.05% platinum bimetallic on silica support catalyst was used with the control range on bromide set at $6\times10^{-5}$M to $6\times10^{-4}$M. The control range on acidity was set at 0.035M–0.07M hydrogen ion concentration. A 9.0 vol. % hydrogen at the inlet condition was successfully run. Other parameters were set as the following:

| | |
|---|---|
| Temperature, °C. | 25 |
| Pressure, psia | 1000 |
| Gas volume % in pipe | 3.8 |
| Line velocity, ft/sec | 4.1 |
| Pipe Inlet, vol % hydrogen | 9.00 |
| Pipe Exit, vol % hydrogen | 0.15 |
| Weight % catalyst | 0.4 |
| Hydrogen Conversion, pph | 0.41 |
| Weight % hydrogen peroxide | 5.2 |

EXAMPLE 2

5% palladium on alumina catalyst was added to the apparatus described in FIG. 2 with both liquid and spent gas recycle used. Control range on bromide was set at $6\times10^{-5}$M to $6\times10^{-4}$M. The control range on acidity was set at 0.035M–0.07M hydrogen ion concentration. Temperature, pressure, gas composition and recycle rate, catalyst concentration and flow velocity were varied with the results shown in the following table. Hydrogen concentrations in excess of the lower flammable limit were successfully run at the pipe inlet under all test conditions.

| | | | | | | |
|---|---|---|---|---|---|---|
| Temperature °C. | 10 | 15 | 15 | 20 | 20 | 25 |
| Pressure, psia | 1200 | 1200 | 1000 | 1200 | 1200 | 1200 |
| Gas volume % in pipe | 9.5 | 8.9 | 10.5 | 8.9 | 4.4 | 8.5 |
| Line velocity, ft/sec | 14.2 | 14.3 | 12.2 | 7.1 | 14.8 | 14.0 |
| Pipe Inlet, vol % hydrogen | 6.75 | 6.50 | 6.50 | 8.00 | 7.50 | 8.00 |
| Pipe Exit, vol % hydrogen | 3.65 | 2.96 | 3.00 | 3.06 | 2.60 | 2.43 |
| Weight % catalyst | 0.8 | 0.5 | 0.5 | 0.6 | 0.6 | 0.8 |
| Hydrogen conversion, pph | 1.56 | 1.67 | 1.39 | 1.16 | 1.18 | 2.43 |
| Weight % hydrogen peroxide | 15.1 | 13.3 | 8.3 | 8.3 | 9.7 | 12.6 |

While this invention has been described as having preferred designs, it is understood that it is capable of further modifications, uses and/or adaptations of the invention and following in general the principles of the invention and including such departures from the present disclosure as come within known or customary practice in the art to which the present invention pertains, and as may be applied to central features hereinbefore set forth, and fall within the scope of the invention or the limits of the claims appended hereto.

What is claimed is:

1. A process for preparing hydrogen peroxide by reaction of hydrogen and oxygen in the presence of catalyst, comprising the steps of:
   a) establishing an elongated reaction zone for effecting reaction of hydrogen and oxygen to form hydrogen peroxide;
   b) substantially completely filling said reaction zone with an acidic aqueous solution suitable for affecting said reaction of hydrogen and oxygen;
   c) providing in said reaction zone in contact with the aqueous solution a catalytically effective amount of a catalyst for the hydrogen-oxygen reaction and forming a reaction mixture by dispersing hydrogen gas and oxygen gas in the acidic aqueous solution in proportions that are above the lower flammability limit for hydrogen and oxygen at a temperature and pressure sufficient to result in the formation of hydrogen peroxide;
   d) maintaining said reaction mixture at said temperature and pressure until the concentration of hydrogen in the reaction mixture has decreased to below the lower flammability limit for a hydrogen and oxygen mixture;
   e) removing the resulting reaction mixture from said reaction zone; and
   f) separating the resulting reaction mixture into a spent gas phase containing hydrogen and oxygen in a proportion below the lower flammability limit thereof and an aqueous solution phase containing hydrogen peroxide.

2. The process of claim 1, including the step of:
   a) continuously feeding said reaction zone with the aqueous solution.

3. The process of claim 2, including the step of:
   a) continuously feeding said reaction zone with hydrogen and oxygen at a point downstream from the aqueous solution feed 4. The process of claim 2, including the step of:
   a) feeding separate streams of oxygen and hydrogen to said reaction zone.

5. The process of claim 4, wherein:
   a) said oxygen and hydrogen feeding step includes introducing oxygen at a point downstream from the aqueous solution feed.

6. The process of claim 5, wherein:
   a) said oxygen and hydrogen feeding step includes introducing hydrogen at a point downstream from the oxygen feed.

7. The process of claim 4, wherein:
   a) said hydrogen introducing step includes feeding hydrogen at multiple points along said reaction zone.

8. The process of claim 4, wherein:
   a) said oxygen and hydrogen feeding step includes introducing oxygen and hydrogen substantially simultaneously.

9. The process of claim 4, including the step of:
   a) moving said reacting mixture containing the aqueous solution, the catalyst, and hydrogen and oxygen through said reaction zone in a plug-flow like manner.

10. The process of claim 2, wherein:
    a) said aqueous solution feeding step includes introducing the aqueous solution at a liquid velocity of from about 4 to about 18 ft./sec. wherein the diameter of said reaction zone is about 2 inches.

11. The process of claim 1, wherein:
    a) said step of filling said reaction zone with the aqueous solution includes forming a zone that is substantially free of a vapor phase.

12. The process of claim 1, wherein:
    a) said maintaining step includes maintaining said reaction mixture at said temperature and pressure until the concentration of hydrogen therein has decreased to a level below the lower inflammability limit of about 5 mole % for hydrogen based on the total residual hydrogen and oxygen content.

13. The process of claim 4, including the step of:
   a) combining said spent gas separated from the resulting reaction mixture with the separate stream of oxygen; and
   b) recycling the combined stream of spent gas and oxygen to said reaction zone.

14. The process of claim 4, including the step of:
   a) recycling a portion of the aqueous solution containing hydrogen peroxide separated from the resulting reaction mixture to said reaction zone at a feed point upstream from the oxygen and hydrogen feed points.

15. The process of claim 4, including the step of:
   a) recovering hydrogen peroxide from a portion of said aqueous solution separated from the resulting reaction mixture.

16. The process of claim 14, including the step of:
   a) adding a fresh supply of the aqueous solution to said aqueous solution containing hydrogen peroxide separated from the resulting reaction mixture prior to recycling a portion thereof 17. The process of claim 14, including the step of:
   a) separating from subsequent resulting reaction mixture an aqueous solution having a higher hydrogen peroxide content than the recycled portion of the aqueous solution.

18. The process of claim 14, including the step of:
   a) repeating for a predetermined number of times said step of recycling a portion of the aqueous solution; and
   b) separating from subsequent resulting mixture an aqueous solution having a hydrogen peroxide content of about 10-20% by weight of the aqueous solution.

19. The process of claim 1, including the step of:
   a) establishing said reaction zone having a predetermine length and feed and discharge ends;
   b) feeding the aqueous solution adjacent said feed end a a first flow velocity;
   c) feeding a stream of oxygen adjacent said feed end at second flow velocity;
   d) feeding a stream of hydrogen adjacent said feed end at a third flow velocity;
   e) coordinating said first, second and third flow velocities with the length of said reaction such that the concentration of hydrogen at said discharge end of said reaction zoneis below the lower flammability limit for a hydrogen and oxygen mixture.

* * * * *